US009330530B2

(12) United States Patent
Englman

(10) Patent No.: US 9,330,530 B2
(45) Date of Patent: May 3, 2016

(54) BANK WAGERING GAME

(75) Inventor: Allon G. Englman, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 2460 days.

(21) Appl. No.: 11/579,444

(22) PCT Filed: May 5, 2005

(86) PCT No.: PCT/US2005/015687

§ 371 (c)(1), (2), (4) Date: Jul. 30, 2007

(87) PCT Pub. No.: WO2005/113088

PCT Pub. Date: Dec. 1, 2005

(65) Prior Publication Data

US 2008/0045341 A1 Feb. 21, 2008

Related U.S. Application Data

(60) Provisional application No. 60/570,583, filed on May 13, 2004.

(51) Int. Cl.
*A63F 9/24* (2006.01)
*A63F 13/00* (2014.01)
(Continued)

(52) U.S. Cl.
CPC ............ *G07F 17/3223* (2013.01); *G07F 17/32* (2013.01); *G07F 17/3244* (2013.01); *G07F 17/3262* (2013.01); *G07F 17/3276* (2013.01); *G07F 17/34* (2013.01)

(58) Field of Classification Search
CPC . G07F 17/32; G07F 17/3244; G07F 17/3262; G07F 17/3276
USPC ........................................ 463/16, 20, 25, 42
See application file for complete search history.

(56) References Cited

U.S. PATENT DOCUMENTS 4,624,459 A 11/1986 Kaufman .................. 273/143 R
4,837,728 A 6/1989 Barrie et al. .................. 364/412
(Continued)

FOREIGN PATENT DOCUMENTS

CA 2334546 A1 8/2001 .............. G01F 17/34
DE 195 15 983 A1 11/1996 .............. G07F 17/34
(Continued)

OTHER PUBLICATIONS

International Search Report PCT/US05/15687 dated Sep. 19, 2005 (2 pages).

(Continued)

*Primary Examiner* — Omkar Deodhar
*Assistant Examiner* — Wei Lee
(74) *Attorney, Agent, or Firm* — Nixon Peabody LLP

(57) ABSTRACT

System and method are disclosed for conducting a group-wagering game in which players at several gaming terminals may play wagering games and win together. The method and system of the invention involves connecting a bank of gaming terminals to a bank server. The bank server automatically plays a group-wagering game on a periodic basis in which players at the gaming terminals in the bank of gaming terminals may participate. Depending on the outcome of the group-wagering game, eligible players may be awarded prizes outright, or they may be granted a group-bonus game. The prizes and awards won may depend on the amounts wagered at the gaming terminal.

55 Claims, 8 Drawing Sheets

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(56) References Cited

U.S. PATENT DOCUMENTS 4,861,041 A 8/1989 Jones et al. ................... 273/292
4,948,134 A 8/1990 Suttle et al. ..................... 273/85
5,116,055 A 5/1992 Tracy ........................ 273/138 A
5,249,800 A 10/1993 Hilgendorf et al. ....... 273/138 A
5,275,400 A 1/1994 Weingardt et al. .............. 273/85
5,280,909 A 1/1994 Tracy ........................ 273/138 A
5,344,144 A 9/1994 Canon ....................... 273/138 A
5,377,973 A 1/1995 Jones et al. ............... 273/85 CP
5,393,057 A 2/1995 Marnell, II ................ 273/85 CP
5,417,430 A 5/1995 Breeding ...................... 273/292
5,482,289 A 1/1996 Weingardt .................... 273/269
5,524,888 A 6/1996 Heidel ............................ 463/22
5,544,892 A 8/1996 Breeding ...................... 273/292
5,564,700 A 10/1996 Celona ............................ 463/27
5,577,731 A 11/1996 Jones ............................ 273/292
5,577,959 A 11/1996 Takemoto ....................... 463/25
5,580,063 A 12/1996 Edwards ....................... 273/378
5,580,309 A 12/1996 Piechowiak et al. ............ 463/16
5,611,730 A 3/1997 Weiss .............................. 463/20
5,645,486 A 7/1997 Nagao et al. ..................... 463/27
5,647,592 A 7/1997 Gerow .......................... 463/139
5,655,961 A 8/1997 Acres et al. ..................... 463/27
5,722,890 A 3/1998 Libby et al. ..................... 463/17
5,743,800 A 4/1998 Huard et al. .................... 463/26
5,766,076 A 6/1998 Pease et al. ..................... 463/27
RE35,864 E 7/1998 Weingardt ...................... 463/27
5,779,549 A 7/1998 Walker et al. ................... 463/42
5,816,918 A 10/1998 Kelly et al. ..................... 463/16
5,820,459 A 10/1998 Acres et al. ..................... 463/25
5,823,874 A 10/1998 Adams ............................ 463/17
5,830,063 A 11/1998 Byrne ............................. 463/25
5,839,956 A 11/1998 Takemoto ....................... 463/18
5,842,698 A 12/1998 Brown .......................... 273/292
5,848,932 A 12/1998 Adams ............................ 463/20
5,851,011 A 12/1998 Lott ............................. 273/292
5,851,147 A 12/1998 Stupak ............................ 463/13
5,855,515 A 1/1999 Pease et al. ..................... 463/27
5,876,284 A 3/1999 Acres et al. ..................... 463/25
5,885,158 A 3/1999 Torango et al. ................. 463/25
5,941,773 A 8/1999 Harlick .......................... 463/26
5,944,606 A 8/1999 Gerow ............................ 463/27
5,951,011 A 9/1999 Potter et al. ................... 273/292
5,975,528 A 11/1999 Halaby ......................... 273/148
5,993,316 A 11/1999 Coyle et al. ..................... 463/25
6,000,699 A 12/1999 Long ............................ 273/292
6,003,013 A 12/1999 Boushy et al. .................. 705/10
6,007,427 A 12/1999 Wiener et al. ................... 463/17
6,012,982 A 1/2000 Piechowiak et al. ............ 463/16
6,020,884 A 2/2000 MacNaughton et al. ..... 345/329
6,032,955 A 3/2000 Luciano et al. ............ 273/138.1
6,039,648 A 3/2000 Guinn et al. .................... 463/16
6,047,963 A 4/2000 Pierce et al. .............. 273/121 B
6,077,162 A 6/2000 Weiss .............................. 463/26
6,089,976 A 7/2000 Schneider et al. .............. 463/16
6,089,977 A 7/2000 Bennett ........................... 463/20
6,089,980 A 7/2000 Gauselmann ................... 463/27
6,102,474 A 8/2000 Daley ............................ 296/836
6,102,798 A 8/2000 Bennett ........................... 463/16
6,102,799 A 8/2000 Stupak ............................ 463/27
6,105,964 A 8/2000 Maahs .......................... 273/292
6,110,043 A 8/2000 Olsen .............................. 463/27
6,139,013 A 10/2000 Pierce et al. .............. 273/121 B
6,142,872 A 11/2000 Walker et al. ................... 463/16
6,146,273 A 11/2000 Olsen .............................. 463/27
6,155,925 A 12/2000 Giobbi et al. ................... 463/20
6,158,741 A 12/2000 Koelling ....................... 273/292
6,159,097 A 12/2000 Gura .............................. 463/20
6,164,651 A 12/2000 Webb ............................ 273/274
6,168,155 B1 1/2001 Kuhlman et al. ............. 273/144
6,168,523 B1 1/2001 Piechowiak et al. ............ 463/26
6,203,010 B1 3/2001 Jorasch et al. ............. 273/138.1
6,203,429 B1 3/2001 Demar et al. .................. 463/20
6,206,374 B1 3/2001 Jones .............................. 463/26
6,206,782 B1 3/2001 Walker et al. ................... 463/25
6,210,275 B1 4/2001 Olsen .............................. 463/16
6,210,277 B1 4/2001 Stefan ............................ 463/27
6,217,448 B1 4/2001 Olsen .............................. 463/25
6,220,593 B1 4/2001 Pierce et al. ............... 273/138.1
6,224,482 B1 5/2001 Bennett ........................... 463/20
6,224,484 B1 5/2001 Okuda et al. .................... 463/27
6,231,445 B1 5/2001 Acres .............................. 463/27
6,241,608 B1 6/2001 Torango .......................... 463/27
6,254,483 B1 7/2001 Acres .............................. 463/26
6,299,533 B1 10/2001 Parra et al. ...................... 463/17
6,312,332 B1 11/2001 Walker et al. ................... 463/23
6,315,660 B1 11/2001 DeMar et al. ................... 463/16
6,319,125 B1 11/2001 Acres .............................. 463/25
6,319,127 B1 11/2001 Walker et al. ................... 463/26
6,331,148 B1 12/2001 Krause et al. ................. 473/274
6,336,857 B1 1/2002 McBride ......................... 463/12
6,336,859 B2 1/2002 Jones et al. ..................... 463/42
6,336,862 B1 1/2002 Byrne ............................. 463/27
6,345,824 B1 2/2002 Selitzky ........................ 273/292
6,347,996 B1 2/2002 Gilmore et al. ................. 463/17
6,352,479 B1 3/2002 Sparks, II ....................... 463/42
6,358,149 B1 3/2002 Schneider et al. .............. 463/27
6,361,441 B1 3/2002 Walker et al. ................... 463/42
6,364,768 B1 4/2002 Acres et al. ..................... 463/25
6,375,567 B1 4/2002 Acres .............................. 463/25
6,375,568 B1 4/2002 Roffman et al. ................ 463/26
6,406,369 B1 6/2002 Baerlocher et al. ............ 463/20
6,409,602 B1 6/2002 Wiltshire et al. ............... 463/42
6,416,408 B2 7/2002 Tracy et al. ..................... 463/16
6,416,409 B1 7/2002 Jordan ............................ 463/27
6,422,940 B1 7/2002 Walker et al. ................... 463/13
6,431,983 B2 8/2002 Acres .............................. 463/25
6,435,510 B2 8/2002 Moore .......................... 273/292
6,435,968 B1 8/2002 Torango .......................... 463/27
6,439,995 B1 8/2002 Hughs-Baird et al. .......... 463/20
6,482,089 B2 11/2002 DeMar et al. ................... 463/20
6,506,117 B2 1/2003 DeMar et al. ................... 463/20
6,508,707 B2 1/2003 DeMar et al. ................... 463/16
6,508,709 B1 1/2003 Karmarkar ...................... 463/42
6,517,073 B1 2/2003 Vancura ........................ 273/274
6,517,433 B2 2/2003 Loose et al. .................... 463/20
6,520,855 B2 2/2003 DeMar et al. ................... 463/20
6,537,150 B1 * 3/2003 Luciano et al. ................. 463/16
6,569,016 B1 5/2003 Baerlocher ..................... 463/16
6,577,733 B1 6/2003 Charrin ......................... 380/251
6,589,115 B2 7/2003 Walker et al. ................... 463/25
6,592,458 B1 7/2003 Ho ................................... 463/17
6,592,460 B2 7/2003 Torango .......................... 463/27
6,599,186 B1 7/2003 Walker et al. ................... 463/17
6,599,188 B2 7/2003 Hirsch et al. .................... 463/19
6,599,193 B2 7/2003 Baerlocher et al. ............ 463/27
6,601,771 B2 8/2003 Charrin ......................... 235/492
6,609,673 B1 8/2003 Johnson ........................ 242/423
6,626,758 B1 9/2003 Parham et al. .................. 463/25
6,648,753 B1 11/2003 Tracy et al. ..................... 463/16
6,648,762 B2 11/2003 Walker et al. ................... 463/25
6,652,378 B2 11/2003 Cannon et al. .................. 463/20
6,656,052 B2 12/2003 Abramopoulos et al. ...... 463/47
6,676,513 B2 1/2004 Gauselmann ................... 463/20
6,685,560 B1 2/2004 Hughes ........................... 463/16
6,692,353 B2 2/2004 Walker et al. ................... 463/30
6,712,695 B2 3/2004 Mothwurf et al. .............. 463/25
6,712,699 B2 3/2004 Walker et al. ................... 463/42
6,733,390 B2 5/2004 Walker et al. ................... 463/23
6,755,741 B1 6/2004 Rafaeli ........................... 463/25
6,776,715 B2 8/2004 Price .............................. 463/27
6,790,141 B2 9/2004 Muir ............................... 463/42
6,837,793 B2 1/2005 McClintic ....................... 463/42
6,869,361 B2 3/2005 Sharpless ........................ 463/25
6,878,063 B2 * 4/2005 Manfredi et al. ............... 463/25
6,880,824 B2 4/2005 Thinnes ........................ 273/139
6,887,154 B1 5/2005 Luciano, Jr. et al. ........... 463/26
6,887,159 B2 5/2005 Leen et al. ...................... 463/42

(56) References Cited

U.S. PATENT DOCUMENTS

| | | | | |
|---|---|---|---|---|
| 7,004,466 | B2 | 2/2006 | Gauselmann | 463/138 |
| 7,036,012 | B2 | 4/2006 | Charrin | 213/169 |
| 7,056,215 | B1 | 6/2006 | Olive | 463/27 |
| 7,169,041 | B2 | 1/2007 | Tessmer et al. | 463/16 |
| 7,255,645 | B2 | 8/2007 | Steil et al. | 463/27 |
| 7,311,604 | B2 | 12/2007 | Kaminkow et al. | 463/20 |
| 7,448,949 | B2 | 11/2008 | Kaminkow et al. | 463/26 |
| 7,666,092 | B2 | 2/2010 | Kaminkow et al. | 463/25 |
| 7,854,654 | B2 | 12/2010 | Baerlocher et al. | 463/27 |
| 7,892,093 | B2 | 2/2011 | Kniesteadt et al. | 463/25 |
| 7,963,847 | B2 | 6/2011 | Baerlocher | 463/27 |
| 2002/0042296 | A1* | 4/2002 | Walker et al. | 463/23 |
| 2002/0111209 | A1* | 8/2002 | Walker et al. | 463/25 |
| 2002/0132660 | A1 | 9/2002 | Taylor | 463/16 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2002/0187823 | A1 | 12/2002 | Khal | 463/13 |
| 2003/0014370 | A1 | 1/2003 | Charrin | 17/60 |
| 2003/0027618 | A1 | 2/2003 | Byrne | 463/16 |
| 2003/0027625 | A1 | 2/2003 | Rowe | 463/20 |
| 2003/0030211 | A1 | 2/2003 | Brown | 273/139 |
| 2003/0036430 | A1 | 2/2003 | Cannon | 463/42 |
| 2003/0045337 | A1 | 3/2003 | Byrne | 463/16 |
| 2003/0047874 | A1 | 3/2003 | Leen et al. | 273/292 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0064807 | A1* | 4/2003 | Walker et al. | 463/42 |
| 2003/0078091 | A1 | 4/2003 | Brandstetter et al. | 463/20 |
| 2003/0109306 | A1 | 6/2003 | Karmakar | 463/40 |
| 2003/0114218 | A1 | 6/2003 | McClintic | 463/25 |
| 2003/0119576 | A1 | 6/2003 | McClintic | 463/20 |
| 2003/0148807 | A1 | 8/2003 | Acres | 463/26 |
| 2003/0148808 | A1 | 8/2003 | Price | 463/27 |
| 2003/0157978 | A1 | 8/2003 | Englman | 463/16 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0224852 | A1 | 12/2003 | Walker | 463/20 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0063484 | A1 | 4/2004 | Dreaper et al. | 463/16 |
| 2004/0087368 | A1 | 5/2004 | Gauselmann | 463/42 |
| 2004/0092304 | A1 | 5/2004 | George | 463/29 |
| 2004/0102238 | A1 | 5/2004 | Taylor | 463/16 |
| 2004/0102243 | A1 | 5/2004 | Olsen | 463/25 |
| 2004/0106448 | A1 | 6/2004 | Gauselmann | 463/25 |
| 2004/0132524 | A1 | 7/2004 | Ramstad et al. | 463/16 |
| 2004/0152511 | A1 | 8/2004 | Nicely et al. | 463/27 |
| 2004/0204226 | A1 | 10/2004 | Foster et al. | 463/20 |
| 2004/0204235 | A1 | 10/2004 | Walker et al. | 463/29 |
| 2004/0235552 | A1* | 11/2004 | Gauselmann | 463/16 |
| 2004/0242297 | A1 | 12/2004 | Walker et al. | 463/16 |
| 2004/0242303 | A1 | 12/2004 | Walker et al. | 463/16 |
| 2004/0242316 | A1* | 12/2004 | Oles et al. | 463/20 |
| 2004/0248651 | A1 | 12/2004 | Gagner et al. | 463/42 |
| 2005/0003880 | A1 | 1/2005 | Englman | 463/16 |
| 2005/0003886 | A1 | 1/2005 | Englman et al. | 463/25 |
| 2005/0014554 | A1 | 1/2005 | Walker | 463/20 |
| 2005/0017451 | A1 | 1/2005 | Ollington | 273/292 |
| 2005/0026674 | A1 | 2/2005 | Wolf et al. | 463/19 |
| 2005/0037837 | A1 | 2/2005 | Rowe | 463/25 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0075889 | A1 | 4/2005 | Gomes et al. | 705/1 |
| 2005/0096130 | A1 | 5/2005 | Mullins | 463/27 |
| 2005/0137010 | A1 | 6/2005 | Enzminger et al. | 463/25 |
| 2005/0148382 | A1 | 7/2005 | Fox | 463/19 |
| 2005/0159207 | A1 | 7/2005 | Thomas | 463/20 |
| 2005/0187008 | A1 | 8/2005 | Nakajima | 463/16 |
| 2005/0187014 | A1 | 8/2005 | Saffari et al. | 463/27 |
| 2005/0192073 | A1 | 9/2005 | Nakajima | 463/27 |
| 2005/0192088 | A1 | 9/2005 | Hartman et al. | 463/27 |
| 2005/0215313 | A1 | 9/2005 | O'Halloran | 463/26 |
| 2005/0282628 | A1 | 12/2005 | Beatty | 463/27 |
| 2006/0003829 | A1 | 1/2006 | Thomas | 463/20 |
| 2006/0009280 | A1 | 1/2006 | Joshi et al. | 463/25 |
| 2006/0009283 | A1 | 1/2006 | Englman et al. | 463/29 |
| 2006/0019737 | A1 | 1/2006 | Yang | 463/19 |
| 2006/0019744 | A1 | 1/2006 | Roemer | 463/26 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0035706 | A1 | 2/2006 | Thomas et al. | 463/27 |
| 2006/0052159 | A1 | 3/2006 | Cahill et al. | 463/27 |
| 2006/0073877 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0121971 | A1 | 6/2006 | Slomiany | 463/16 |
| 2006/0135243 | A1 | 6/2006 | Englman et al. | 463/29 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |
| 2007/0259711 | A1 | 11/2007 | Thomas | 463/22 |
| 2008/0020847 | A1 | 1/2008 | Kniesteadt et al. | 463/42 |
| 2008/0070702 | A1 | 3/2008 | Kaminkow et al. | 463/46 |
| 2008/0081690 | A1 | 4/2008 | Baerlocher et al. | 463/25 |
| 2008/0113771 | A1 | 5/2008 | Baerlocher et al. | 463/25 |
| 2008/0139290 | A1 | 6/2008 | Kniesteadt et al. | 463/20 |
| 2008/0153564 | A1 | 6/2008 | Baerlocher et al. | 463/16 |
| 2010/0291991 | A1 | 11/2010 | Baerlocher et al. | 463/20 |

FOREIGN PATENT DOCUMENTS

| | | | | |
|---|---|---|---|---|
| DE | 196 24 321 A1 | 1/1998 | G07F 17/32 |
| EP | 0 521 599 A1 | 1/1993 | G07F 17/34 |
| EP | 1313072 | 5/2013 | |
| GB | 2 153 572 A | 8/1985 | G07F 17/34 |
| GB | 2 181 589 A | 4/1987 | G07F 17/34 |
| GB | 2 242 300 A | 9/1991 | G07F 17/34 |
| GB | 2 313 792 A | 12/1997 | A63F 5/00 |
| GB | 2 333 880 | 8/1999 | G07F 17/34 |
| GB | 2 350 715 A | 12/2000 | G07F 17/32 |
| WO | WO 99/03078 A1 | 1/1999 | G07F 17/34 |
| WO | WO 99/15246 | 4/1999 | A63F 3/06 |
| WO | WO 99/19037 A1 | 4/1999 | A63F 9/22 |
| WO | WO 01/33478 A1 | 5/2001 | G07F 17/34 |
| WO | WO 03/026754 A1 | 4/2003 | A63F 5/00 |
| WO | WO 03/083789 A1 | 10/2003 | |
| WO | WO 2005/113088 A1 | 12/2005 | A63F 13/00 |
| WO | WO 2006/014770 A2 | 2/2006 | A63F 9/24 |
| WO | WO 2006/014990 A2 | 2/2006 | A63F 9/24 |
| WO | WO 2006/039349 A2 | 4/2006 | A63F 9/24 |
| WO | WO 2007/117502 A2 | 10/2007 | A63F 9/24 |

OTHER PUBLICATIONS

Article for "Easy Riches" by Sigma Game, Strictly Slots, 1 page (Aug. 2001).

Article for "Millioniser" by Glenn Haussman, Strictly Slots, pp. 50-53 (Mar. 2004).

(56) References Cited

OTHER PUBLICATIONS

Product Sheet for “Big Games Safari,” IGT, 24 pages (2000).
“New ’97 Games,” International Gaming & Wagering Business, 24 pages (Mar. 1997).
PCT International Search Report for International Application No. PCT/US2005/015687 dated Oct. 28, 2005 (2 pages).
PCT International Search Report for International Application No. PCT/US2006/016536 dated Oct. 5, 2006 (3 pages).
International Search Report—PCT/US06/20979 dated Nov. 13, 2006 (2 pages).
PCT International Search Report for International Application No. PCT/US2006/34407 dated Sep. 28, 2007 (2 pages).
Australian Office Action; Australian Patent Application No. 2012202257, Dated Apr. 4, 2013 (4 pages).
Australian Office Action; Australian Patent Application No. 2012202257, Dated Dec. 10, 2013 (4 pages).
Australian Office Action; Australian Patent Application No. 2005245373, Dated Jul. 23, 2010 (3 pages).
Australian Office Action; Australian Patent Application No. 2005245373, Dated Sep. 28, 2011 (2 pages).

* cited by examiner

BANK WAGERING GAME

CROSS-REFERENCE TO RELATED APPLICATIONS

This application is a U.S. national phase of International Application No. PCT/US2005/015687, filed May 5, 2005, which claims the benefit of priority from U.S. Provisional Application No. 60/570,583, filed May 13, 2004, both of which are incorporated by reference in their entirety.

FIELD OF THE INVENTION

The present invention relates generally to gaming terminals and, more particularly, to a method and system of conducting a group-wagering game in which players at several gaming terminals may participate with or against each other.

BACKGROUND OF THE INVENTION

Gaming terminals, such as slot machines, video poker machines, and the like, have been a cornerstone of the gaming industry for several years. Generally, the popularity of such terminals among players depends on the perceived likelihood of winning money at the terminal and the intrinsic entertainment value of the terminal relative to other available gaming options. Where the available gaming options include a number of competing terminals and the expectation of winning each terminal is roughly the same (or believed to be the same), players are most likely to be attracted to the more entertaining and exciting of the terminals.

Consequently, gaming terminal operators strive to employ the most entertaining and exciting terminals available because such terminals attract frequent play and, hence, increase profitability for the operators. Thus, in the highly competitive gaming terminal industry, there is a continuing need to develop new types of games, or improvements to existing games, that will enhance the entertainment value and excitement associated with the games.

One concept that has been successfully employed in existing gaming terminals to enhance player entertainment is the use of progressive games. In the gaming industry, a "progressive" game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

Another concept that has been employed is that of a secondary or "bonus" game which may be played in conjunction with a "basic" game. The bonus game may include any type of game, either similar to or entirely different from the basic game, and is initiated by the occurrence of certain pre-selected events or outcomes of the basic game. Such a bonus game has been found to produce a significantly higher level of player excitement than the basic game alone because it provides an additional chance to play, which increases the player's overall expectation of winning.

In existing gaming terminals, the basic game and the bonus game are played on an individual, stand-alone basis. That is, each player plays and wins at his own gaming terminal without any active involvement or participation from other players at other gaming terminals. Even the progressive jackpot mentioned above is still a stand-alone event because only individual players may win (i.e., players cannot win the progressive jackpot as a group). There are presently no arrangements where players at several gaming terminals may actively play and win together as a group. It has been observed, however, that when players can play and win together, there is a sense of camaraderie and fellowship that results in greater player excitement and enjoyment.

Accordingly, what is needed is a gaming terminal that is capable of providing increased excitement and entertainment value over existing gaming terminals. More specifically, what is needed is a gaming terminal that can provide a group-wagering game in which a player may play and win together with other players.

SUMMARY OF THE INVENTION

The present invention is directed to a method and system for conducting a group-wagering game in which players at several gaming terminals may play wagering games and win together. The method and system of the invention involves connecting a bank of gaming terminals to a bank server. The bank server automatically plays a group-wagering game on a periodic basis in which players at the gaming terminals in the bank of gaming terminals may participate. Depending on the outcome of the group-wagering game, eligible players may be awarded prizes outright, or they may be granted a group-bonus game. The prizes and awards won may depend on the amounts wagered at the gaming terminal.

In general, in one aspect, the invention is directed to a wagering game system. The wagering game system comprises a bank server for conducting a group-wagering game on a periodic basis and a bank of gaming terminals where each gaming terminal is connected to the bank server. The gaming terminals in the bank of gaming terminals conduct a terminal-level wagering game and periodically forward wager data to the bank server to determine player eligibility for the group-wagering game. The bank server awards a prize to eligible players at the bank of gaming terminals if there is a winning outcome for the group-wagering game.

In general, in another aspect, the invention is directed to a method of conducting a group-wagering game involving a bank of gaming terminals where each gaming terminal is connected to a bank server. The method comprises the steps of collecting wager data for each player at the gaming terminals and periodically forwarding the wager data to the bank server. The method further comprises conducting a group-wagering game on the bank server for the bank of gaming terminals in response to the forwarding of the wager data and awarding a prize to eligible players at the bank of gaming terminals if an outcome of the group-wagering game is a winning outcome.

In general, in yet another aspect, the invention is directed to a gaming terminal. The gaming terminal comprises a network interface unit for connecting the gaming terminal to a network in which a group-wagering game is conducted. The gaming terminal further comprises a wager tracking unit for tracking wager data at the gaming terminal. The wager tracking unit is configured to periodically forward the wager data to the network via the network interface. At least one display is present on the gaming terminal for displaying terminal-level wagering games conducted by the gaming terminal. The display displays a group-bonus game conducted by the network in response to a winning outcome for the group-wagering game.

In general, in yet another aspect, the invention is directed to a method of conducting a wagering game that comprises the steps of receiving wager inputs at one or more of the plurality of gaming terminals and conducting a terminal-level wagering game at the one or more gaming terminals in response to receiving the wager inputs. The method further comprises the step of receiving wager data at the server, including an amount of the wager inputs, from the plurality of gaming terminals at a periodic interval. A group-wagering game is conducted on the server for the plurality of gaming terminals in response to the receiving step, and a prize is awarded to eligible players at the plurality of gaming terminals if an outcome of the group-wagering game is a winning outcome.

In general, in still another aspect, the invention is directed to a method of conducting a wagering game that includes the steps of collecting wager data at the server from each of the plurality of gaming terminals, and determining player eligibility at each of the plurality of gaming terminals based on the wager data. The method further includes the steps of conducting a first session of a group-wagering game on the server for the plurality of gaming terminals, and informing players at the plurality of gaming terminals of an outcome of the group-wagering game.

In general, in yet another aspect, the invention is directed to a wagering game system having a plurality of gaming terminals connected to a server. The wagering game system comprises means for collecting wager data at the server from each of the plurality of gaming terminals, and means for determining player eligibility at each of the plurality of gaming terminals based on the wager data. The wagering game system further comprises means for conducting a first session of a group-wagering game on the server for the plurality of gaming terminals, and means for informing players at the plurality of gaming terminals of an outcome of the group-wagering game.

In general, in still another aspect, the invention is directed to a method of conducting a group-wagering game at a plurality of gaming terminals. The method comprises conducting a first session of a group-wagering game in which player eligibility for each gaming terminal is based on wagering at each gaming terminal during a first period of time. The method further comprises, after the first session is complete, conducting a second session of a group-wagering game in which player eligibility for each gaming terminal is based on wagering at each gaming terminal during a second period of time, where the second period of time begins immediately after the first period of time is complete.

In general, in yet another aspect, the invention directed to a method of operating a gaming terminal. The method comprises steps of conducting a terminal-level wagering game on the gaming terminal and periodically transmitting wager data for the terminal-level wagering game from the gaming terminal to a server connected to the gaming terminal. The method further comprises the steps of receiving and displaying on the gaming terminal information for a first session of a group-wagering game corresponding to a first set of transmitted wager data, and receiving and displaying on the gaming terminal information for a second session of a group-wagering game corresponding to a second set of transmitted wager data.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1:
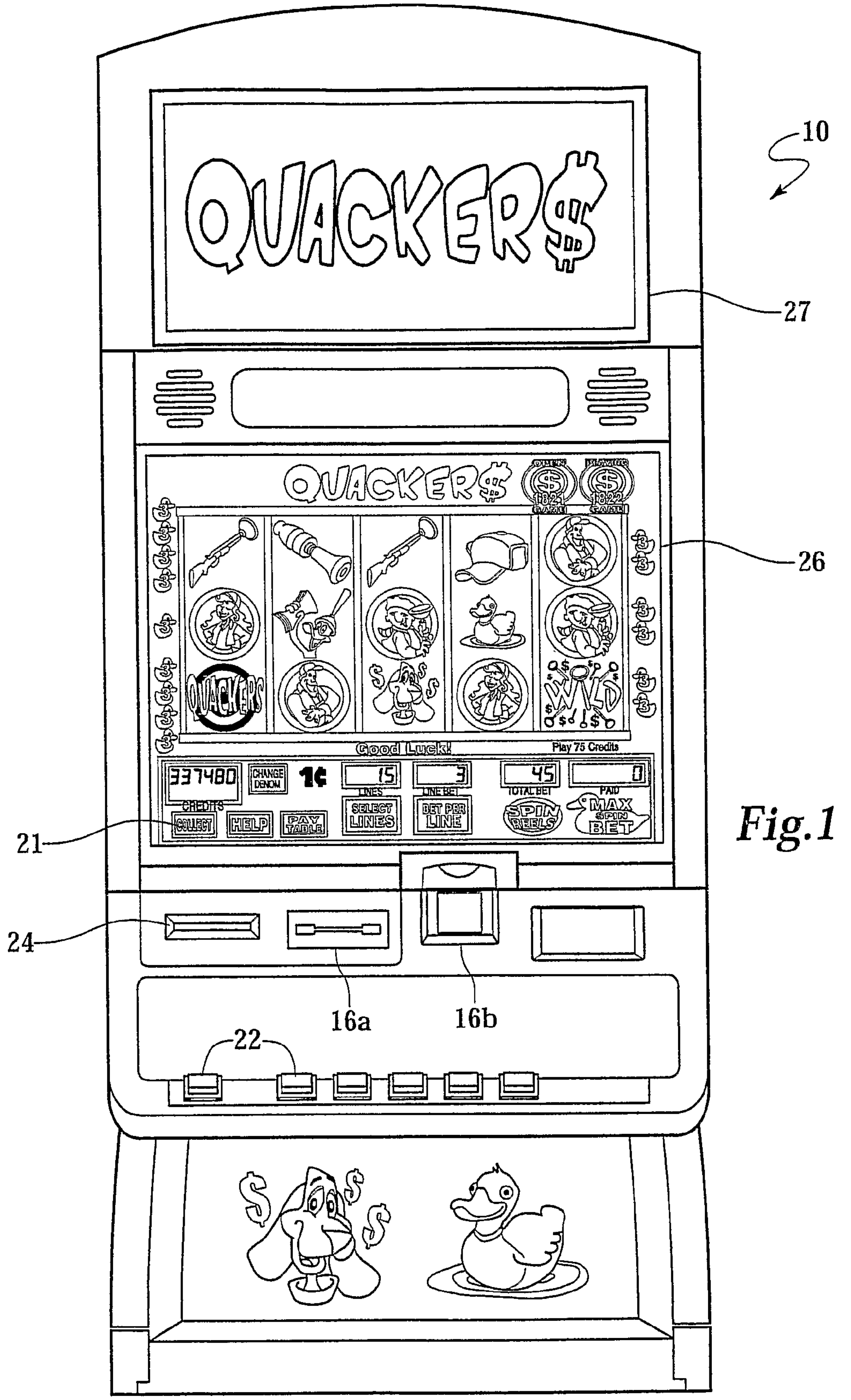
FIG. 1 illustrates a perspective view of a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

As alluded to above, most people prefer to be part of a group rather than by themselves. Therefore, embodiments of the invention provide a system and method for players at several gaming terminals to play a group-wagering game in addition to the normal, terminal-level wagering games. The eligibility of the players to participate in and win at the group-wagering game is based on the amounts wagered at the gaming terminals. Player identification and tracking of the player is not necessary to the practice of the invention, although these features may certainly be incorporated into the invention. In most embodiments, however, players may participate in the group-wagering game on an anonymous basis with respect to the gaming terminals.

FIG. 1 shows a perspective view of an exemplary gaming terminal 10 according to embodiments of the invention. The gaming terminal 10 may be operated as a stand-alone terminal, or it may be connected to a network of gaming terminals. Further, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game, such as blackjack, slots, keno, poker, etc. In the example shown, the gaming terminal 10 is a video slot machine.

As shown, the gaming terminal 10 has a number of typical gaming terminal components, including input devices, such as a wager acceptors 16*a* and 16*b*, push-buttons 22. In some embodiments, a player-identification card reader 24 may also be present, although such a player-identification card reader 24 is not necessary to the practice of the present invention. For outputs, the gaming terminal 10 includes a main display 26 for displaying information about the basic wagering game and a secondary display 27 for displaying information about the bonus wagering game. While these typical components found in the gaming terminal 10 are described below, it should be understood that numerous other elements may exist and may be used in any number of combinations to create various forms of a gaming terminal.

The wager acceptors 16*a* and 16*b* may be provided in many forms, including a card wager acceptor 16*a* and a cash wager acceptor 16*b*. The cash wager acceptor 16*b* may include a coin slot acceptor or a note acceptor to input value to the gaming terminal 10. The card wager acceptor 16*a* may include a card-reading device for receiving a stored value card and reading a recorded monetary value associated with the card. The card wager acceptor 16*a* may also receive a card that authorizes a transfer of money from a player's credit or banking account to the gaming terminal 10.

The player-identification card reader 24, if present, is designed to read an identification card and extract information therefrom regarding the player's identity. The identification may then be used by casinos for rewarding certain players with complimentary services or special offers. For example, a player may be enrolled in the gaming establishment's players' club and may be awarded certain complimentary services as that player collects points in his or her player-tracking account. When the player inserts his or her card into the player-identification card reader 24, the casino's computers can register that player's wagering at the gaming terminal 10.

The push buttons 22, which may be mechanical push buttons, allow players to select various options with respect to the games played on the gaming terminal 10. The gaming terminal 10 may also include soft buttons on a touch screen 21 located over the main display 26 that serve similar functions.

The main display 26 displays the outcome of the basic wagering game and may take a variety of forms. For example, the main display 26 may be a conventional 3-slot mechanical reel, or it may take the form of a cathode ray tube (CRT), a liquid crystal display (LCD), a plasma display, or any other type of display that is suitable for simulating a 3-slot mechanical reel. A secondary display 27, which may also be a CRT, LCD, plasma display, or other type of suitable display, displays a secondary or bonus game that is often played on the gaming terminal 10 in addition to the basic game.

Figure 2:
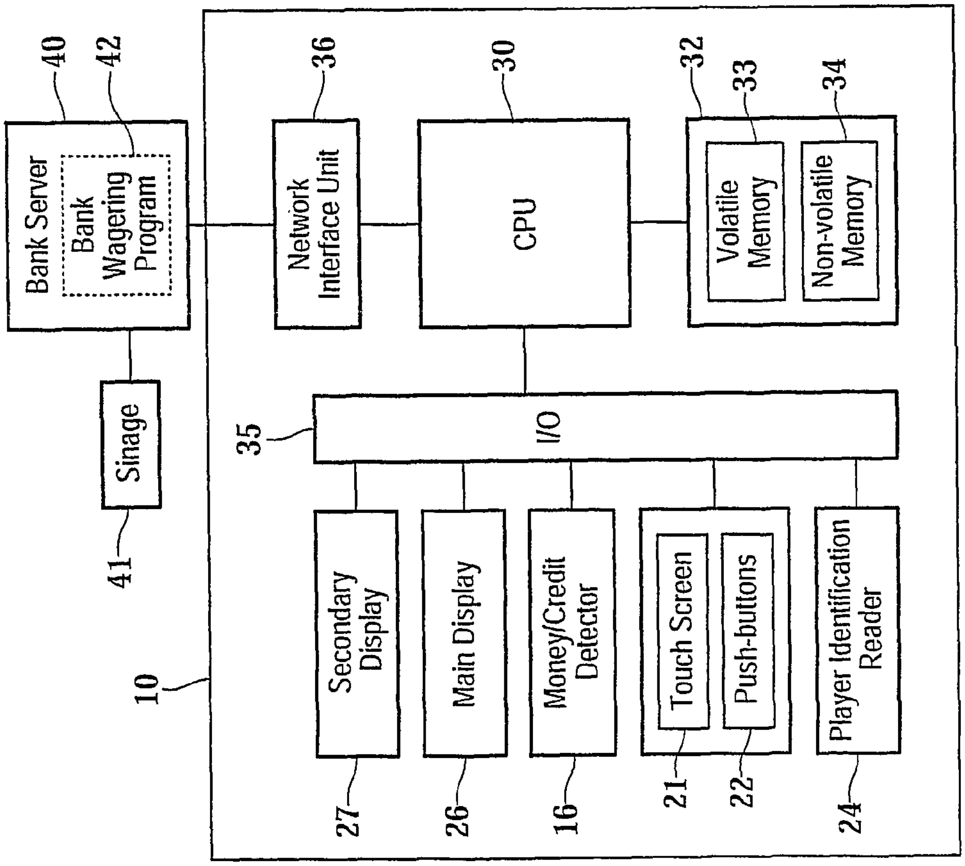
FIG. 2 illustrates the gaming terminal of FIG. 1 in more detail.

FIG. 2 shows the various components of the gaming terminal 10 in block diagram form. As can be seen, the components of the gaming terminal 10 are controlled by a central processing unit (CPU) 30, such as a microprocessor or microcontroller. The CPU 30 executes one or more programs that randomly selects the outcomes for the gaming terminal 10 and controls the overall operation of the gaming terminal 10. The gaming terminal 10 also includes a storage unit 32 that includes a volatile memory 33 (e.g., a random-access memory (RAM)) and a non-volatile memory 34 (e.g., hard drive, optical drive, an EEPROM). It should be appreciated that the CPU 30 may include one or more microprocessors. Similarly, the storage unit 32 may include multiple volatile memories and non-volatile memories.

Communication between the components of the gaming terminal 10 and the CPU 30 occur through input/output (I/O) circuits 35. As such, the CPU 30 also controls and receives inputs from the various components of the gaming terminal 10.

A network interface unit 36, which may be a network interface card, connects the gaming terminal 10 to a bank server 40. The bank server 40 may be a gaming terminal similar to the gaming terminal 10, or it may be a computer that is capable of executing games of chance similar to those of the gaming terminal 10. As discussed below, the bank server 40 is configured to conduct a real-time, group-wagering game in which players at several gaming terminals may participate and win together as a group. The group-wagering game may be conducted in parallel with any terminal-level wagering game that might be conducted on the gaming terminals, such as a basic wagering game or a bonus wagering game. Thus, the players are, in essence, playing two wagering games at once. Depending on the outcome of the group-wagering game, each player at the gaming terminals may win a prize outright, or they may be awarded a bonus round, as will described later herein.

The group-wagering game is part of a bank wagering program 42 that is stored on and executed by the bank server 40. The bank wagering program 42 is capable of executing various games of chance on the bank server 40, including a slot machine game, a lottery game, and other types of wagering games commonly played on gaming terminals. The bank server 40 may then run one of these games as a real-time group-wagering game for the gaming terminals connected to the bank server 40. The group-wagering game may be displayed on a signage 41 connected to and controlled by the bank server 40, on the main display 26, or on the secondary display 27 of each gaming terminal 10 connected to the bank server 40.

Figure 3:
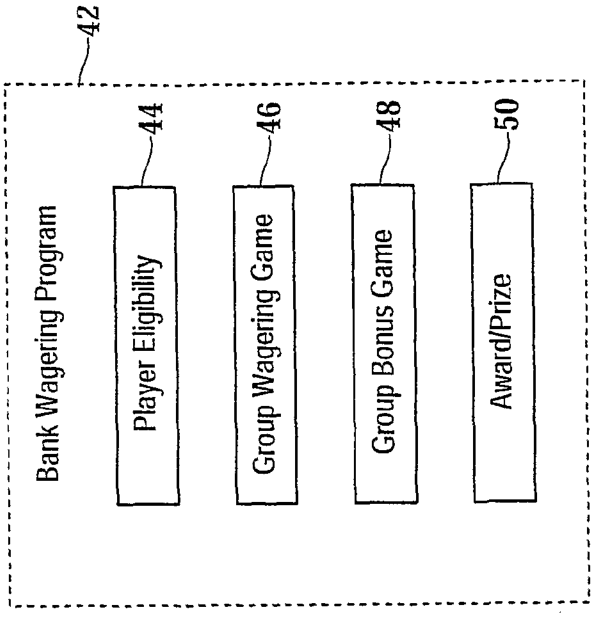
FIG. 3 illustrates a bank wagering program according to one embodiment of the present invention.

FIG. 3 illustrates the bank wagering program 42 of the bank server 40 in more detail. As can be seen, the bank wagering program 42 is composed of a number of functional modules, including a player eligibility module 44, a group-wagering game module 46, a group-bonus game module 48 and an award/prize module 50. Although four discrete modules are shown here, those having ordinary skill in the art will understand that the functions of any two or more modules may be combined into a single module, or the functions of any single module may be divided into several sub-modules. Each of the modules will now be described in turn.

The player eligibility module 44 has the responsibility of determining which players are eligible to participate in the group-wagering game. The player eligibility module 44 performs its function by periodically obtaining wager information from the gaming terminals connected to the bank server 40. For example, the player eligibility module 44 may request that the gaming terminals 10 forward their wager information to the bank server 40 at certain intervals, such as every 30 seconds, every minute, and so forth. The wager information allows the player eligibility module 44 to determine whether a player was playing at a gaming terminal when the group-wagering game is started. This avoids unduly awarding a prize or a group-bonus game to a player who had not been playing at the gaming terminal, but had just stepped up to the gaming terminal when the group-wagering game began.

The content of the wager information may include, for example, the wager amounts or the turnover and the time when the wagers were placed. The term "turnover" as used herein refers to the amount of money wagered at the gaming terminal 10 over a predefined interval (e.g., 30 seconds, 1 minute, etc.). Player eligibility is determined based on the wager amounts or the turnover at the gaming terminals and not on player identification. In one embodiment, players at all gaming terminals connected to the server 40 are eligible regardless of the wager amounts as long as the players are currently playing at the gaming terminals. In another embodiment, however, the player eligibility module 44 may have additional requirements as to which players are eligible. For example, the player eligibility module 44 may require a turnover of at least $1 per unit of time (e.g., within a 30 second interval) at the gaming terminal in order for the player to be eligible for the group-wagering game. Preferably, the player eligibility module 44 and the group-wagering game module 46 are synchronized in time so that player eligibility may be determined before each group-wagering game is conducted.

The period in which eligibility is considered may be the same as the turnover interval in embodiments where eligibility is contingent upon a minimum turnover amount. For other embodiments where a minimum turnover amount is not required, the eligibility period is not necessarily the same as the turnover interval and may be longer or shorter. In these latter embodiments, the turnover amount is used instead to determine the type of prize/award won, if any, not eligibility. In either case, the eligibility period may be defined to expire before the group-wagering game begins. Then, a new eligibility period may start either immediately after the previous eligibility period expires (i.e., without any break in between), or it may begin some predetermined amount of time after the previous eligibility period expires. In some embodiments, the eligibility period may be defined simply as, for example, a 30-second or one-minute interval immediately preceding the beginning of the group-wagering game, regardless of the frequency or timing or the group-wagering game.

The group-wagering game module 46 is responsible for conducting the group-wagering game. Preferably, the group-wagering game may be conducted periodically and in real-time on the signage 41. As used herein, the term "periodically" means occurring every interval where adjacent intervals may be of the same duration or they may be different. The frequency with which the group-wagering game is conducted may be a preset interval (e.g., every 30 seconds, once per minute, etc.), or the group-wagering game may be conducted continuously (e.g., one game after the other without a break in between). It is also possible to conduct the group-wagering game randomly or according to some preset schedule (e.g., once every few hours) provided the wager amounts or the turnover are obtained for the preceding turnover interval and eligibility is determined before starting the group-wagering game. All eligible players may then win a prize or participate in a group-bonus game depending on the outcome of the group-wagering game.

As alluded to above, the group-wagering game has basically two categories of winning outcomes: prize outcomes, and bonus game outcomes (which may lead to a prize outcome). For the first category, eligible players are awarded a prize outright, without any further participation. Prizes may include a bank jackpot (or a portion thereof), cash, credits, gifts certificates, and the like, based on the outcome of the group-wagering game. Thus, different outcomes may result in different prizes. Alternatively, a single winning outcome may be the trigger for all prizes, in which case the group-wagering game module 46 randomly selects the particular prize to award upon occurrence of the winning outcome.

For the bonus game outcomes, one of several group-bonus games may be awarded. A group-bonus game module 48 is responsible for this aspect of the invention. There are several types of group-bonus games available and the specific group-bonus game awarded may depend on the particular outcome of the group-wagering game. For example, the outcome of the group-wagering game may result in a communal type bonus game, a competitive type bonus game, or an individual type bonus game. An example of these games is provided later with respect to FIGS. 6-7. For each type of bonus game (i.e., communal, competitive, individual), there may be a single variation of that type, or there may be several variations of that type from which to chose. In the latter case, the group-bonus game module 48 selects the particular variations to be used for the resulting type. Alternatively, all the group-bonus games may be lumped together and selected at random, and the group-wagering game outcome merely signals the start of a group-bonus session (i.e., it does not influence the selection of the group-bonus game). It is also possible to simply cycle through one or more sequences of group-bonus games instead of selecting them one at a time.

To conduct the group-bonus game, the group-bonus game module 48 causes the group-bonus game to be displayed on the signage 41, preferably where all eligible players can view the outcome. This is ideal for communal type group-bonus games where all eligible players win as a group, although their individual winnings may vary based on their respective wager amounts during the eligibility time period (e.g., the last 30 seconds). In addition, or alternatively, the group-bonus game module 48 may cause the group-bonus game to be displayed at the gaming terminals (e.g., on the main display 26 or the secondary display 27) of each eligible gaming terminal. This embodiment is preferred for competitive type group-bonus games where players compete against each other and individual performance matters.

The award/prize module 50 is responsible for determining the award/prize won by eligible players at the gaming terminals. In one embodiment, the award/prize module 50 performs its function by first calculating a percentage (e.g., 5%) of the turnover from the most recent turnover interval for each gaming terminal. This amount indicates the turnover level at the gaming terminals and may be used by the award/prize module 50 to determine the actual award/prize given to eligible players. Under such an arrangement, players who wager more (resulting in higher turnover) may expect to win more, while players who wager less may expect to win less, even though the players are playing the same group-wagering. Thus, while the players may win together as a group, the award/prize that is actually won by each player may be different.

The percentage of the turnover from the most recent turnover interval is also added to a bank jackpot from which prizes may be subsequently drawn upon the occurrence of a winning outcome. Each group-wagering game adds to the size of the bank jackpot until a winning outcome occurs. It is also possible for the bank jackpot to be arbitrarily set by the award/prize module 50, in which case the bank jackpot stays the same until a winning outcome occurs.

Figure 4:
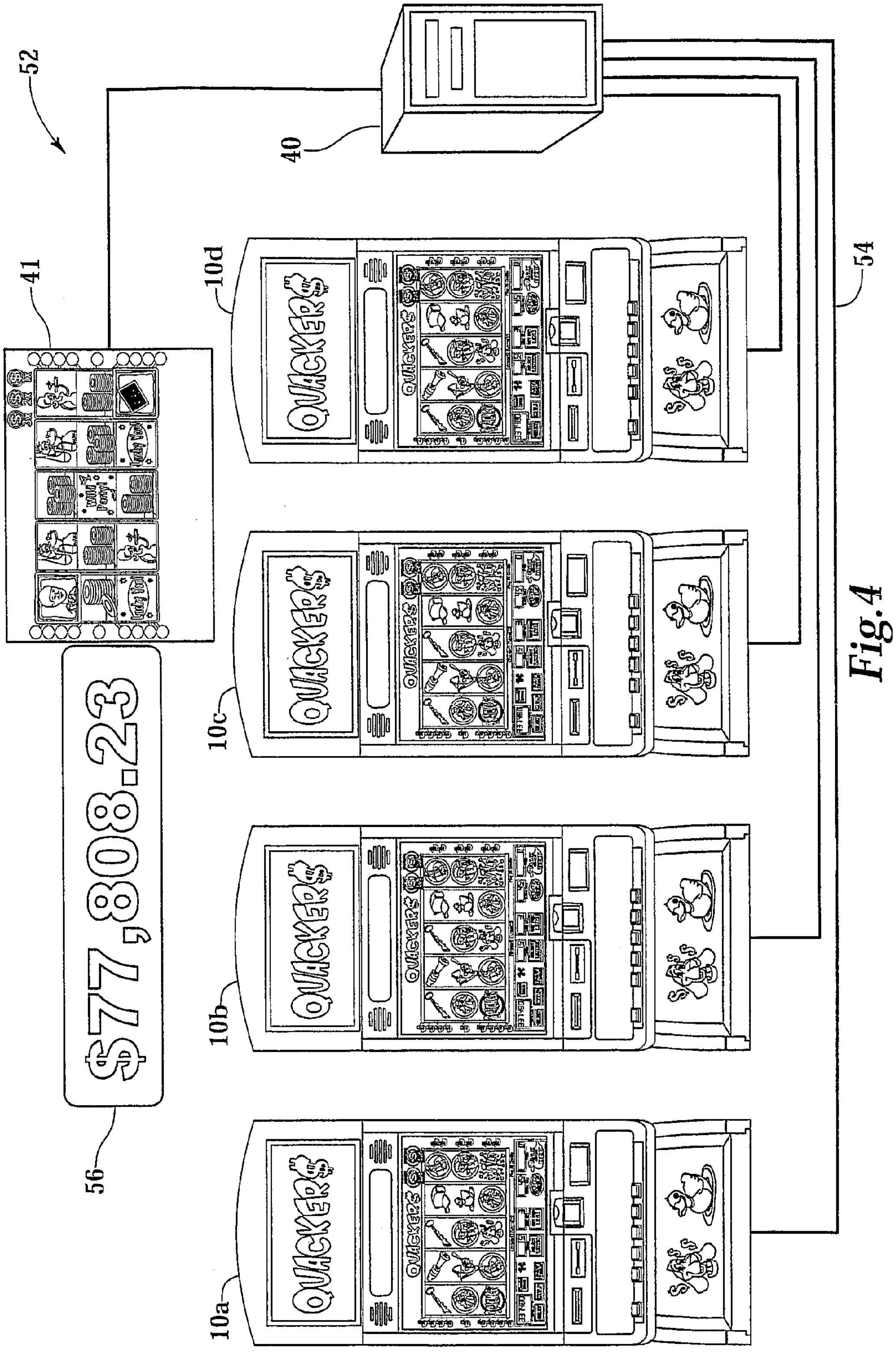
FIG. 4 illustrates a bank of gaming terminals connected to a bank server according to one embodiment of the present invention.

FIGS. 4-7 illustrate one exemplary implementation of a group-wagering game system according to embodiments of the invention. As can be seen in FIG. 4, a game bank 52 includes a number of gaming terminals 10*a-d* connected to a bank server 40. The gaming terminals 10*a-d* may be any suitable gaming terminals, including mechanical gaming terminals configured to play mechanical slots, electrical or electromechanical gaming terminals configured to play, for example, video casino games such as blackjack, slots, keno, poker, and the like. Each gaming terminal 10*a-d* may be configured to play a different basic wagering game, or they all may be configured to play the same basic wagering game. Further, the gaming terminals 10*a-d* may share a common theme, such as the PowerBall® lottery, or each gaming terminal 10*a-d* may have its own theme that is different from the other gaming terminals 10*a-d*.

The gaming terminals 10*a-d* allow players to play a normal, terminal-level wagering game, including a basic wagering game and, perhaps, a bonus wagering game. In addition, the gaming terminals 10*a-d* also allow players to participate in a bank-level or group-wagering game conducted by the bank server 40. Players who are eligible may win a prize or a subsequent group-bonus game based on the outcome of the group-wagering game. Eligibility is based on the wager amounts or the turnover at the gaming terminals 10*a-d*, irrespective of the identity of the player or the type of terminal-level wagering games conducted by the gaming terminals 10*a-d*. To prevent awarding a prize or a group-bonus game to a player who just stepped up to a gaming terminal, the wager amounts or the turnover may be obtained as close to the beginning of the group-wagering game as possible.

Alternatively, in some embodiments, determining player eligibility may be accomplished by tracking the player's wagers on the gaming terminals 10*a-d*. In that case, the player's identification (read via the player-identification card reader 24, as shown, for example, in FIGS. 1-2)) may be used to monitor the wagers. Thus, for example, if the player has accumulated a certain minimum wager amount over a predetermined time period, then he or she is eligible for the group-wagering game. The player's identification may also be used for other activities, such as awarding monthly prizes and so forth.

The connection between the gaming terminal 10*a-d* and the server 40 may be any suitable network connection 54, such as an Ethernet connection. Preferably, the gaming terminals 10*a-d* are located close to one another to enhance the sense of camaraderie and fellowship and also to allow the players to more easily see the signage 41 mounted above the gaming terminals 10*a-d*. A bank jackpot display 56 displays the current bank jackpot, which may be an accumulated amount or an arbitrary amount.

Figure 5A:
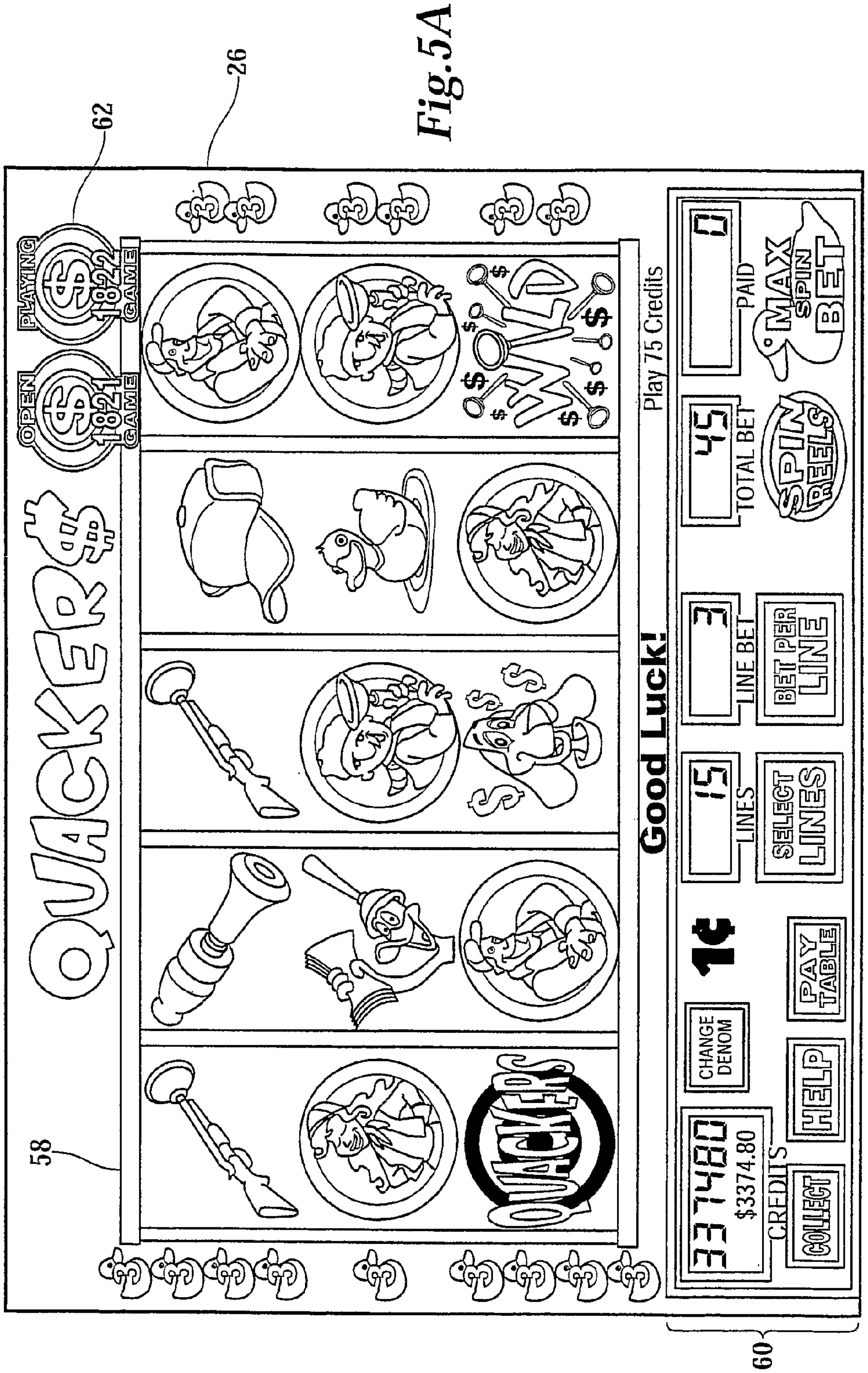
FIGS. 5A-B illustrate a main screen of one of the gaming terminals in the bank of gaming terminal according to one embodiment of the present invention.

FIG. 5A illustrates the main screen 26 of one of the gaming terminals 10*a-d*, for example, the gaming terminal 10*b* of FIG. 4, in more detail. The actual composition of the main screen 26 may change according to the type of game being conducted, but in general, the main screen 26 includes a game outcome area 58 and a game information area 60. The game outcome area 58 displays the outcomes of the various wagering games conducted on the gaming terminal 10*b*, while the game information area 60 displays information about the wagering games (e.g., wager amounts, jackpot amount, etc.). In addition, the information area 60 also displays several touch screen buttons 21 that the player may use to access certain options and functions.

Figure 5B:
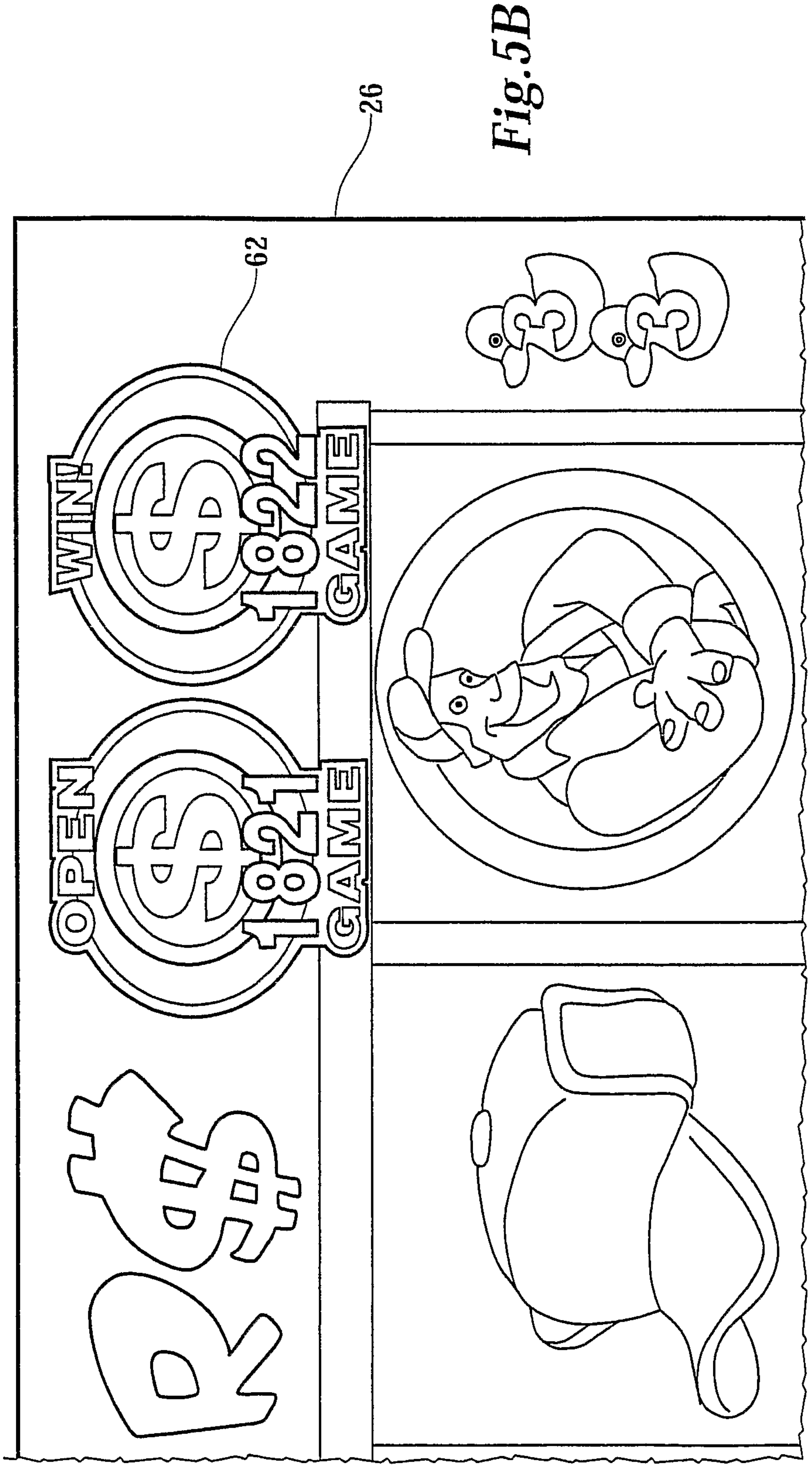

The main screen 26 of the gaming terminals 10*a-d* may further include group-game status indicators 62 for indicating the statuses of the group-wagering games being played on the signage 41 by the bank server 40. FIG. 5B shows a close-up view of the group-game status indicators 62. As can be seen, the group-game status indicators 62 indicate that group-wagering game number 1821 is presently being played, while group-wagering game number 1822 has just resulted in a winning outcome. The group-game status indicators 62 may also indicate the level of turnover at the gaming terminals 10*a-d* for each group-wagering game. In one embodiment, the group-game status indicators 62 use different colored coins called "virtual tokens" (described further below) to indicate the level of turnover at the gaming terminals 10*a-d* for each group-wagering game number.

In some embodiments, a timer (not expressly shown) may be displayed on the group-game status indicators 62 for each gaming terminal 10*a-d* that shows the time remaining until the start of the next group-wagering game. Where eligibility is based on a minimum wager amount or a minimum turnover, it is also possible to implement a counter (not expressly shown) that shows the current level of wager or turnover and the additional wager amount needed for the player to become eligible.

Operation of the above exemplary group-wagering game system is as follows. For each group-wagering game played by the bank server 40, the gaming terminals 10*a-d* are assessed on their level of turnover and assigned a virtual token based on this level. As mentioned earlier, turnover refers to the amount of money wagered at the gaming terminal over a predetermined interval (e.g., 30 seconds, one minute, etc.). The bank server 40 then calculates a percentage (e.g., 5%) of the turnover for each eligible gaming terminal and automatically adds this amount to the bank jackpot (which is displayed on the jackpot display 56) to be awarded in the group-wagering game. The level of turnover is represented on the main screen 26 of the eligible gaming terminals by virtual tokens, the colors of which reflect the different turnover levels. This allows the bank server 40 to determine what type of prize to award eligible players upon a winning outcome. An exemplary implementation may be as follows:

TABLE 1

| Turnover | Add to Jackpot | Virtual Token |
|---|---|---|
| $0-$2.50 | 0$-$0.13 | Bronze Coin |
| $2.51-$5.00 | $0.13-$0.25 | Silver Coin |
| $5.01-$10.00 | $0.25-$0.50 | Gold Coin |

In the example above, if the player bets more than $10 during a turnover interval, he or she accumulates more than one Gold Coin. Thus, if the player bets $13, he or she accumulates a Gold Coin and a Silver Coin.

Once the bank server 40 has received the turnover for the game bank 52, it conducts the group-wagering game and presents the outcome thereof. If the outcome is a non-winning outcome, the players at the eligible gaming terminals are notified accordingly (e.g., via the game status indicators 62 on the main display 26). If the outcome is a winning outcome, then the players at the eligible gaming terminals are similarly notified, as shown for game 1822 in FIG. 5B.

Figure 6:
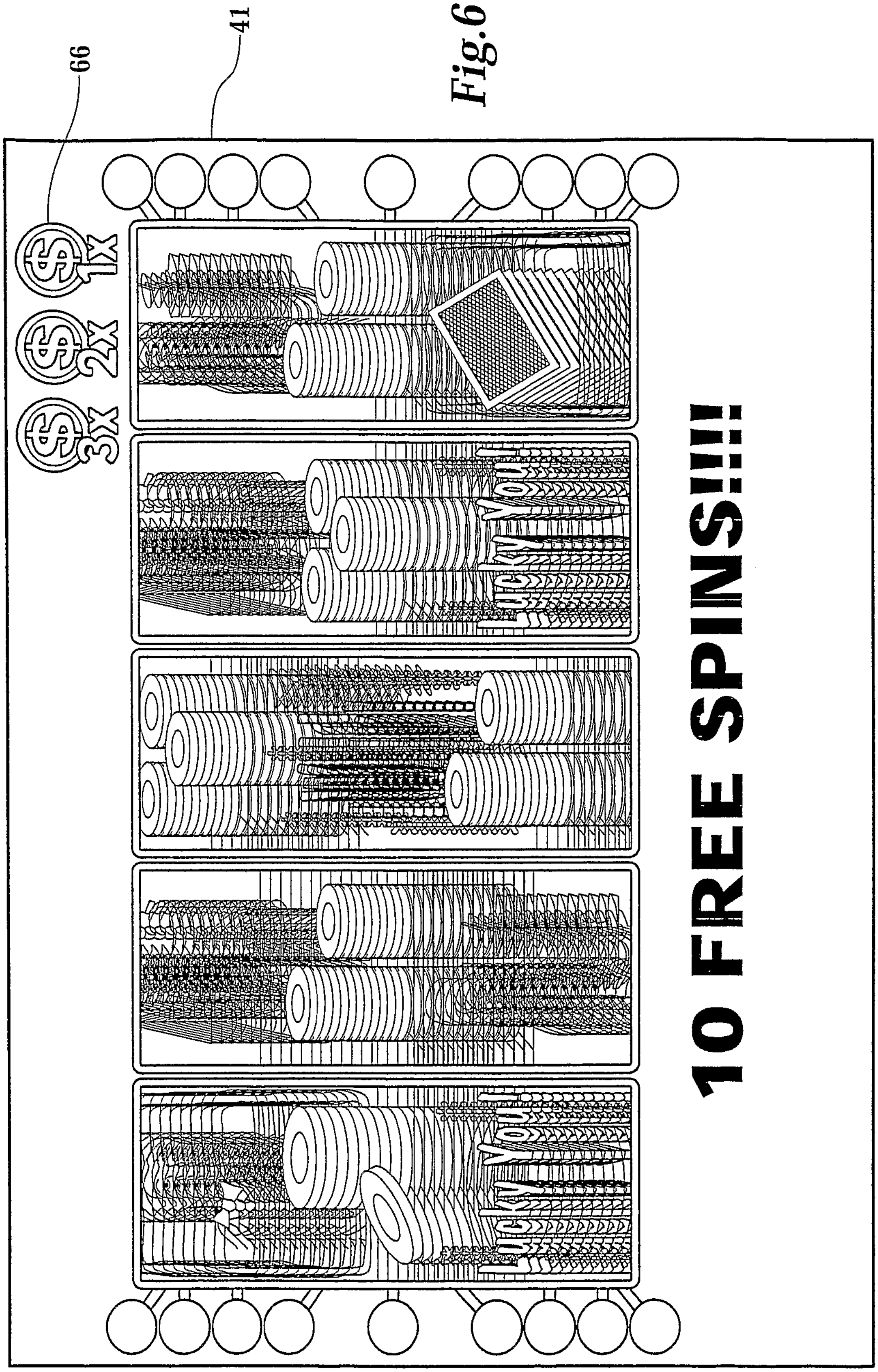
FIG. 6 illustrates a signage used by the bank server according to one embodiment of the present invention.

If the winning outcome results in a communal bonus game, then the bank server 40 starts one of the communal group-bonus games, for example, a free-spins game. In the free-spins game, all eligible players receive a certain number (e.g., 10) of free spins on a slot-type game having spinning reels The slot-type game is displayed on the signage 41 and/or possibly on the secondary displays 27 of each eligible gaming terminals. An example of the free spins game as conducted on the signage 41 is shown in FIG. 6. The actual composition of the signage 41 may change according to the type of game being conducted, but in general, the signage 41 includes a game outcome area 64 and prize/award indicators 66. The game outcome area 64 displays the outcomes of the various group-wagering games conducted by the bank server 40 on the signage 41, while the prize/award indicators 66 indicate the distribution level of the prize/award won based on the virtual tokens wagered. In the present example, a winning spin, if any, may result in the following distribution to the players:

TABLE 2

| Virtual Token | Payout |
|---|---|
| Bronze Coin | 1x jackpot |
| Silver Coin | 2x jackpot |
| Gold Coin | 3x jackpot |
| Gold & Bronze | 4x jackpot |
| Gold & Silver | 5x jackpot |

The benefits of a communal bonus game like free-spins are twofold. First, it creates a communal effect that has been observed to be popular among gaming terminal players. Second, the activity on the signage 41 generates excitement around the game bank 52 that should attract a lot of attention to the game bank 52.

Another type of communal bonus game is a simultaneous communal bonus game. In this game, the players at eligible gaming terminals play out the bonus game on their own at their separate gaming terminals (e.g., on the secondary displayed 27). The only communal aspect of the game is that players at every eligible gaming terminal of the game bank 52 receive the bonus game at about the same time, although it is possible for their individual prize/award to be different.

Yet another type of communal bonus game is an individually driven bonus game where players at all eligible gaming terminals may win, but only the player at one gaming terminal actually plays. The one gaming terminal is randomly selected by the bank server 40 from the eligible gaming terminals. The group-bonus game is then played by the player at that one gaming terminal on either the main screen 26 or the secondary screen 27 of that gaming terminal. The group-bonus game is also displayed on the signage 41 so that players at the non-participating gaming terminals may see the results. If the one active player wins, players at all eligible gaming terminals will receive awards/prizes based on how well the active player performed. For example, if the active player wins 1000 credits, then the players at the other eligible gaming terminals would get a multiple of that amount based on their virtual tokens, as follows:

TABLE 3

| Virtual Token | Payout |
|---|---|
| Bronze Coin | 1x 1000 credits |
| Silver Coin | 2x 1000 credits |
| Gold Coin | 3x 1000 credits |
| Gold & Bronze | 4x 1000 credits |
| Gold & Silver | 5x 1000 credits |

In addition, the bank server 40 may set aside a certain portion of the bank jackpot for random distribution to players at individual gaming terminals. The reason for this random distribution is because some of the awards/prizes may take a longer time to hit, in which case, the players will need some encouragement to keep playing. By randomly awarding such awards/prizes, for example, a free-spin series, the players at the gaming terminals are kept from becoming too disheartened.

Figure 7:
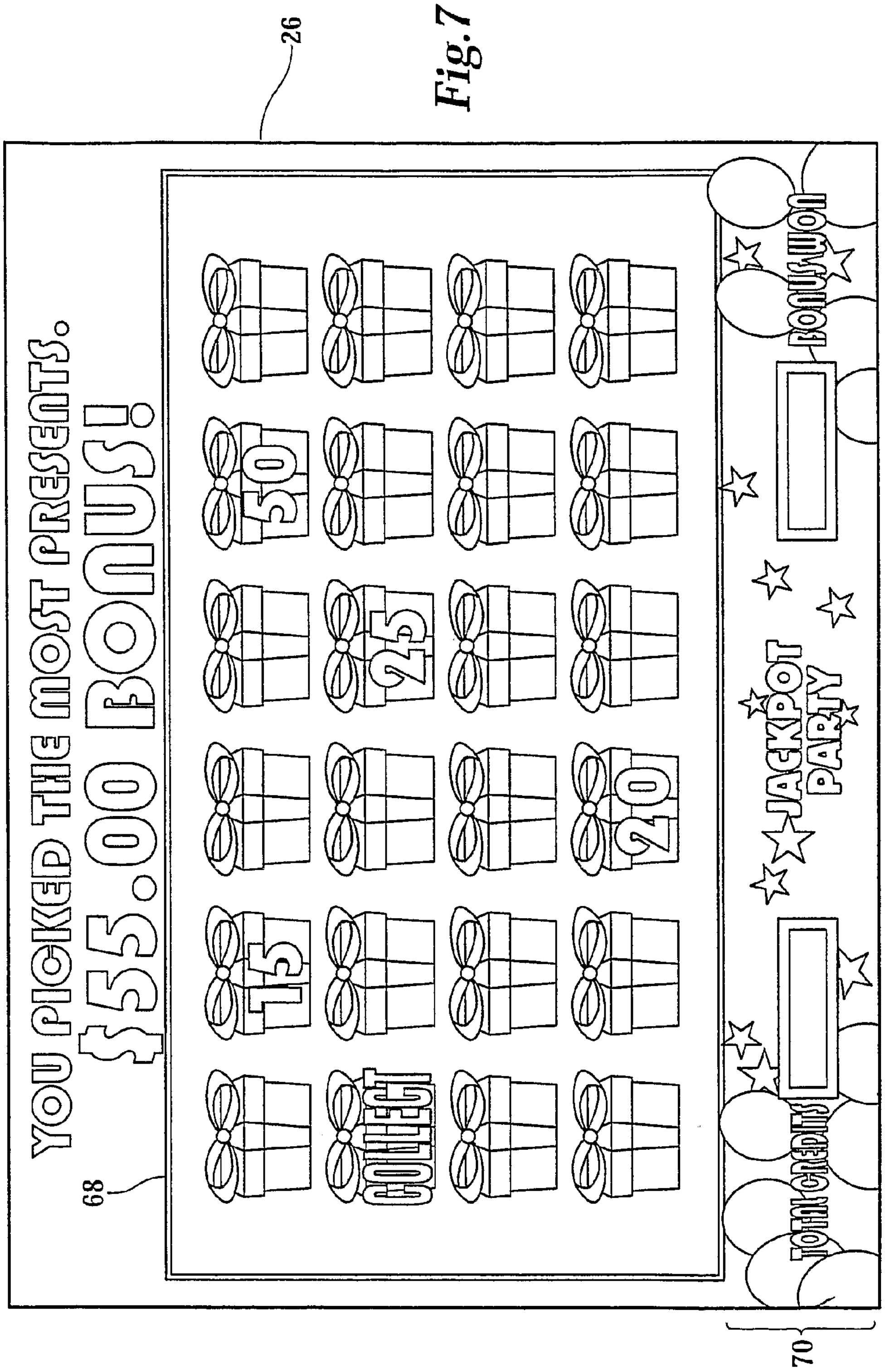
FIG. 7 illustrates an exemplary group-bonus game that may be played at the group of gaming terminals.
Figure 8:
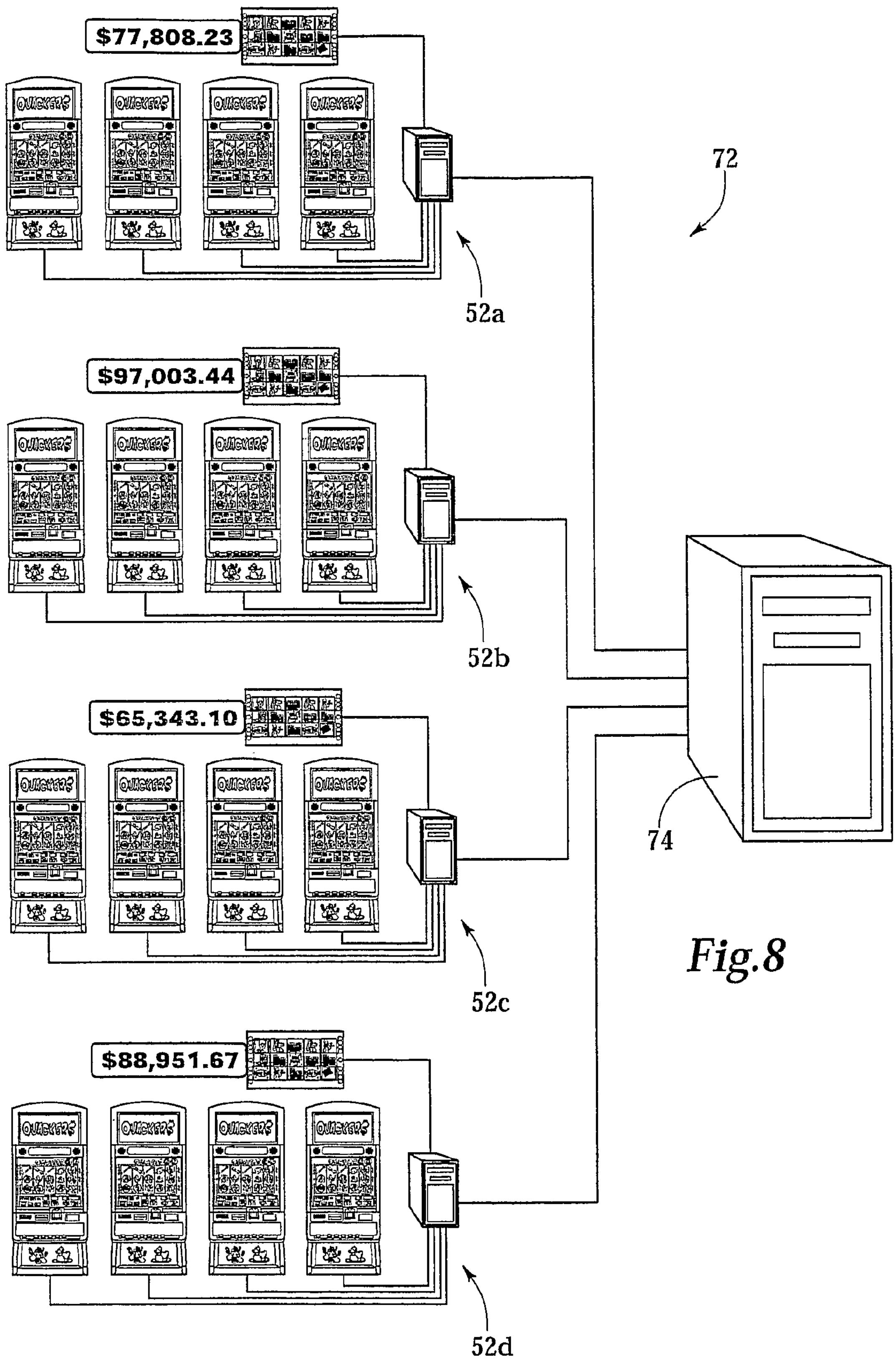
FIG. 8 illustrates several banks of gaming terminals connected together to form a super group according to one embodiment of the present invention.

An example of a competitive bonus game where eligible players compete against each other for awards/prizes is a player-selection game, shown and described with respect to FIG. 7. In this game, all gaming terminals have the game outcome area 68 of either their main display 26 or their secondary display 27 (see FIG. 2) showing an array of presents. The game information area 70 of each display 26 or 27 shows various information about the game. The eligible players then select presents, each present revealing a prize or credits when selected, while avoiding so-called "pooper" presents, which terminate the bonus game. The player or players with the highest number of prizes or credits at the conclusion of the game win an additional bonus award/prize.

The additional bonus award/prizes may be determined using a preset equation that may vary depending on the number of players. To take one example, the equation may be:

$$A^*(Y-Z)=C \quad (1)$$

where X=number of eligible players, Y=% of bank server jackpot (which may be an expected value), Z=% of bank server jackpot set aside for awards, A=total coin-in data for all eligible gaming terminals connected to the bank server 40, and C=net amount available for award/prize distribution.

That result of Equation (1) is then multiplied by a preset person-based equation that involves the number of eligible players X. Thus, for example, if X is less than 50, the award may be distributed as follows:

TABLE 4

| Placement | Award |
|---|---|
| 1st | 50 x C |
| 2nd | 30 x C |
| 3rd | 20 x C |

Sometimes, a group-bonus game may be announced while an eligible player is still in the middle of a terminal-level basic game. Thus, the player may be unable to participate in the group-bonus game. Further, he or she may have to play a terminal-level bonus game afterward if a certain outcome occurs on the basic game. In order not to exclude these players from the group-bonus game, in one embodiment, eligible players may be "grandfathered" for the group-bonus game whereby they retain their eligibility for a predetermined time period (e.g., up to 1 minute). Then, after the player completes the regular basic or bonus game, he or she may start the group-bonus game. This will allow the players to wrap up their individual basic and/or bonus games without losing the opportunity of playing the group-bonus game.

While only a single game bank 52 has been described thus far, in some embodiments, it is possible to link several game banks together over a LAN or WAN to form a super-game bank 72, such as the one shown in FIG. 7. As can be seen, the super game bank 72 is composed of several game banks 52*a-d* with bank servers that are connected to a super bank server 74. The super game bank 72 operates in a similar way to the game bank 52, except that it conducts a super-group-wagering game involving players at multiple game banks 52*a-d*.

To determine player eligibility, wager information is provided periodically from the game banks 52*a-d* to the super bank server 74. Eligibility is again based on the wager amounts or the turnover at the gaming terminals, irrespective of player identity or the types of game played at the gaming terminals. It is also possible to determine eligibility on a per bank basis instead of a per player basis where all players at a game bank 52*a-d* may be eligible based on the total wager amounts or the total turnover for the game bank.

The super bank server 74 then conducts the super-group-wagering game on, for example, the signage 41 of each game bank 52*a-d*, and notifies the eligible players accordingly of the outcome either on the signage 41 or on their individual gaming terminals, or both. The outcome may be an outright prize, or it may be super-group-bonus game in which all eligible players may participate and win. The super-group-bonus game is essentially similar to the group-bonus game described above except more players are involved and, therefore, will not be described in detail here.

Advantages of the invention include an environment where every eligible player at a bank of gaming terminals wins at the same time, thus fostering a sense of camaraderie and fellowship. The players may also compete against one another in real-time across a network while at the same time winning. Further, the invention results in a significant feeling of having gotten something for free because the players get to play two wagering games, a terminal-level game and a group-level game, for the price of a single wager. The group-level game is run automatically at every interval regardless of the outcome of the terminal-level game. Thus, a player may lose at the terminal-level game, but still strike it rich if the player wins at the group-level game. Finally, the invention does not require identifying the players or tracking their wagers to determine eligibility. The players may participate in the invention on an anonymous basis.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming system, comprising:

a group of gaming machines adapted to conduct respective machine-level casino wagering games, each of the gaming machines including an electronic display device and one or more electronic input devices;

one or more controllers configured to detect at each gaming machine, via at least one of the one or more electronic input devices, a physical item associated with a monetary value that establishes a credit balance, initiate at each gaming machine a respective one of the machine-level casino wagering games in response to an input indicative of a wager covered by the credit balance, receive at each gaming machine, via at least one of the one or more electronic input devices, a cashout input that initiates a payout from the credit balance; and a server connected to at least one of the group of gaming machines for conducting, via at least one of the one or more controllers, a group game that presents one or more group game outcomes on each electronic display device of at least two gaming machines of the group of gaming machines, the server determining whether each gaming machines is eligible to participate in the group game and determining a modifier for each of the eligible gaming machines based on game-play activity occurring over a plurality of plays of the machine-level casino wagering game on that machine, the group game incorporating two or more eligible gaming machines and presenting at least one common indicia of the group game outcomes on the electronic display device of each of the two or more eligible gaming machines, at least two of the eligible gaming machines having a different modifier, the server awarding to each of the eligible gaming machines respective individual awards, each of the individual awards including at least one of the one or more group game outcomes modified by the modifier for the eligible gaming machine.

2. The system of claim 1, wherein the group game is a bonus game and the one or more group game outcomes is at least one prize outcome.

3. The system of claim 2, wherein the bonus game is a communal-type bonus game.

4. The system of claim 3, wherein the communal-type bonus game is a free-spins game.

5. The system of claim 3, wherein the communal-type bonus game is a simultaneous communal bonus game.

6. The system of claim 2, wherein the bonus game is a competitive-type bonus game.

7. The system of claim 1, wherein the group game is initiated at a preset time interval.

8. The system of claim 1, wherein the group game is initiated randomly.

9. The system of claim 1, wherein the eligible gaming machines are determined before the group game is conducted.

10. The system of claim 1, wherein the modifier for each eligible gaming machine is determined based on turnover information for that particular gaming machine.

11. The system of claim 1, wherein the server is located physically outside of any of the gaming machines within the group of gaming machines.

12. A gaming system, comprising:

a plurality of gaming machines each including an electronic display device and one or more electronic input devices; and one or more controllers configured to:

detect at each gaming machine, via at least one of the one or more electronic input devices, a physical item associated with a monetary value that establishes a credit balance, initiate at each gaming machine a respective machine-level casino wagering game in response to an input indicative of a wager covered by the credit balance, determine whether each of the gaming machines is eligible to participate in a group game, the eligibility of each gaming machine being determined based upon game-play activity occurring on the respective gaming machine over a plurality of plays of the machine-level casino wagering games, initiate the group game during the presentation of the machine-level casino wagering games, the group game incorporating at least two gaming machines determined to be eligible, randomly generate one or more game outcomes for the group gam;

present at least one common indicia of the game outcomes on the electronic display device of each of the at least two gaming machines determined to be eligible to participate in the group game, provide an award to the at least two eligible gaming machines, and receive at each gaming machine, via at least one of the one or more electronic input devices, a cashout input that initiates a payout from the credit balance.

13. The gaming system of claim 12, wherein the one or more controllers includes a server.

14. The gaming system of claim 13, wherein the server is located outside the plurality of gaming machines.

15. The gaming system of claim 12 further comprising a signage adapted to display the group game to a plurality of players, at least one of the one or more controllers being connected to, and programmed to control, the signage.

16. The gaming system of claim 12, wherein the game-play activity is wagering activity.

17. The gaming system of claim 16, wherein the wagering activity is a turnover amount.

18. The gaming system of claim 17, wherein the eligibility of each gaming machine is determined based on the turnover amount being greater than a minimum threshold.

19. The gaming system of claim 18, wherein the one or more controllers are further programmed to determine a modifier for each of the eligible gaming machines.

20. The gaming system of claim 19, wherein the modifier is determined based on the difference between the turnover amount and the minimum threshold.

21. The gaming system of claim 20, wherein the modifier increases as the difference between the turnover amount and the minimum threshold increases.

22. A gaming system, comprising:

a plurality of gaming machines each including an electronic display device and one or more electronic input devices; and one or more controllers comprising:

a player-eligibility module that determines which of the plurality of gaming machines are eligible to participate in a group game based on game-play activity occurring on the respective gaming machines over a plurality of plays of a machine-level casino wagering game, the group game incorporating at least two of the plurality of gaming machines, a group-bonus-game module that causes the group game to be displayed to eligible gaming machines, and an award module for determining an award for each of the eligible gaming machines;

wherein the one or more controllers are configured to detect at each gaming machine, via at least one of the one or more electronic input devices, a physical item associated with a monetary value that establishes a credit balance, initiate at each gaming machine the machine-level casino wagering game in response to an input indicative of a wager covered by the credit balance, present at least one common indicia of an outcome of the group game on the electronic display device, and receive at each gaming machine, via at least one of the one or more electronic input devices, a cashout input that initiates a payout from the credit balance.

23. The gaming system of claim 22, wherein the determined award is a base award for each of the eligible gaming machines.

24. The gaming system of claim 23, wherein the player-eligibility module further determines a modifier for each of the eligible gaming machines.

25. The gaming system of claim 24, wherein the base award is enhanced by the determined modifiers to form respective final awards for each of the eligible gaming machines.

26. The gaming system of claim 25, wherein at least two of the modifiers and two of the final awards are not equal.

27. The gaming system of claim 22, wherein the group-bonus-game module selects at least one of a plurality of bonus games to display to the eligible gaming machines.

28. The gaming system of claim 27, wherein the plurality of bonus games include one or more of communal bonus games and competitive bonus games.

29. The gaming system of claim 22, wherein the game-play activity is a turnover amount.

30. The gaming system of claim 29, wherein the eligibility of each gaming machine is determined based on the turnover amount being greater than a minimum threshold.

31. The gaming system of claim 30, wherein a modifier is determined for each of the eligible gaming machines based on the difference between the turnover amount and the minimum threshold.

32. A gaming system, comprising:

a plurality of gaming machines each including an electronic display device and one or more electronic input devices;

one or more controllers configured to:

detect at each gaming machine, via at least one of the one or more electronic input devices, a physical item associated with a monetary value that establishes a credit balance, initiate at each gaming machine a respective one of machine-level casino wagering games in response to an input indicative of a wager covered by the credit balance, determine whether each of the gaming machines is eligible to participate in a group game, the eligibility of each gaming machine being determined based upon game-play activity occurring on the respective gaming machine over a plurality of plays of the machine-level casino wagering game, determine a modifier for each of the eligible gaming machines, the modifiers being determined based upon the game-play activity occurring on each of the respective gaming machines over the plurality of plays of the machine-level casino wagering game, initiate the group game during the presentation of the machine-level casino wagering games, the group game incorporating at least two gaming machines determined to be eligible, randomly generate one or more group outcomes for the group game, present at least one common indicia of the one or more group outcomes on the electronic display device of each of the at least two eligible gaming machines, determine a respective base award for each of the at least two eligible gaming machines based on the one or more group outcomes for the group game, determine a respective final award for each of the at least two eligible gaming machines, the respective final award being the base award modified by the modifier determined for that respective eligible gaming machine, provide the respective final award to each of the at least two eligible gaming machines, and receive at each gaming machine, via at least one of the one or more electronic input devices, a cashout input that initiates a payout from the credit balance.

33. The gaming system of claim 32, wherein the game-play activity occurring on the respective gaming machine over the plurality of plays of the machine-level casino wagering game occurs over a successive plurality of plays.

34. A gaming system, comprising:

a plurality of gaming machines each including an electronic display device and one or more electronic input devices; and one or more controllers configured to:

detect at each gaming machine, via at least one of the one or more electronic input devices, a physical item associated with a monetary value that establishes a credit balance, initiate at each gaming machine a machine-level casino wagering game in response to an input indicative of a wager covered by the credit balance, determine whether each of the gaming machines is eligible to participate in a group game, the eligibility of each gaming machine being determined based upon a turnover amount occurring on the gaming machine over a plurality of plays of its machine-level casino wagering game, determine a modifier for each of the eligible gaming machines, the modifiers being determined based upon the turnover amount occurring on the gaming machine over the plurality of plays of its machine-level casino wagering game, initiate the group game during the presentation of the machine-level casino wagering games, the group game incorporating at least two eligible gaming machines determined to be eligible, randomly generate one or more game outcomes for the group game, present at least one common indicia of the game outcomes on the electronic display device of each of the at least two gaming machines, determine a respective base award for each of the at least two eligible gaming machines based on the one or more game outcomes for the group game, determine a respective final award for each of the at least two eligible gaming machines, the final award being the base award multiplied by the modifier respectively determined for each of the at least two eligible gaming machines, provide the respective final award to each of the at least two eligible gaming machines, and receive at each gaming machine, via at least one of the one or more electronic input devices, a cashout input that initiates a payout from the credit balance.

35. The gaming system of claim 34, wherein the base award is the same for each of the at least two eligible gaming machines.

36. The gaming system of claim 34, wherein the eligibility of each gaming machine is determined based on the turnover amount being greater than a minimum threshold.

37. The gaming system of claim 36, wherein the modifier increases as the difference between the turnover and the minimum threshold increases.

38. The gaming system of claim 34, wherein at least two of the modifiers and at least two of the final awards are not equal.

39. The gaming system of claim 34, wherein the group game is a communal-type bonus game.

40. The gaming system of claim 39, wherein the communal-type bonus game is a simultaneous communal bonus game.

41. The gaming system of claim 34, wherein the group game is a competitive-type bonus game.

42. The gaming system of claim 34, wherein the group game is initiated at a preset time interval.

43. The gaming system of claim 34, wherein the group game is initiated randomly.

44. The gaming system of claim 34, wherein the eligible gaming machines are determined before the group game is initiated.

45. The gaming system of claim 34 further comprising a signage adapted to display the group game to a plurality of players, at least one of the one or more controllers being connected to, and programmed to control, the signage.

46. A gaming system, comprising:

a plurality of gaming machines each including an electronic display device and one or more electronic input devices; and one or more controllers comprising:

a player-eligibility module that determines which of the plurality of gaming machines are eligible to participate in a group game based on a turnover amount occurring at each gaming machine over a plurality of plays of a respective machine-level casino wagering game, the eligibility of each gaming machine being determined based on the turnover amount being greater than a minimum threshold amount, the player-eligibility module further determines a modifier for each of the eligible gaming machines, the modifier being determined for each gaming machine based on the difference between the turnover amount and the minimum threshold, a group-bonus-game module that causes the group game to be displayed to each of the eligible gaming machines, and an award module that determines a base award for each of the eligible gaming machines, the award module further determines a final award for each of the eligible gaming machines by multiplying the base award by the multiplier;

wherein the one or more controllers are configured to detect at each gaming machine, via at least one of the one or more electronic input devices, a physical item associated with a monetary value that establishes a credit balance, initiate at each gaming machine the respective machine-level casino wagering game in response to an input indicative of a wager covered by the credit balance, present at each of the eligible gaming machines at least one common indicia of an outcome of the group game on the electronic display device, and receive at each gaming machine, via at least one of the one or more electronic input devices, a cashout input that initiates a payout from the credit balance.

47. The gaming system of claim 46, wherein at least two modifiers and at least two final awards are not equal.

48. The gaming system of claim 46, wherein the group game is a communal-type bonus game.

49. The gaming system of claim 48, wherein the communal-type bonus game is a free spins game.

50. The gaming system of claim 48, wherein the communal-type bonus game is a simultaneous communal bonus game.

51. The gaming system of claim 46, wherein the group game is randomly initiated by the group-bonus-game module.

52. The gaming system of claim 46, wherein the group game is initiated at a preset time interval by the group-bonus-game module.

53. The gaming system of claim 46 further comprising a signage adapted to display the group game to a plurality of players, at least one of the one or more controllers being connected to, and programmed to control, the signage.

54. The gaming system of claim 46, wherein the group-bonus-game module selects at least one of a plurality of bonus games to display to the eligible gaming machines.

55. The gaming system of claim 54, wherein the plurality of bonus games include one or more of communal bonus games and competitive bonus games.

* * * * *

UNITED STATES PATENT AND TRADEMARK OFFICE

CERTIFICATE OF CORRECTION

PATENT NO. : 9,330,530 B2
APPLICATION NO. : 11/579444
DATED : May 3, 2016
INVENTOR(S) : Allon G. Englman It is certified that error appears in the above-identified patent and that said Letters Patent is hereby corrected as shown below:

In the Claims:

On Column 14, Line 48 (Claim 12), delete "gam" and insert --game-- therefor.

Signed and Sealed this
Ninth Day of August, 2016

Michelle K. Lee
*Director of the United States Patent and Trademark Office*